UNITED STATES PATENT OFFICE.

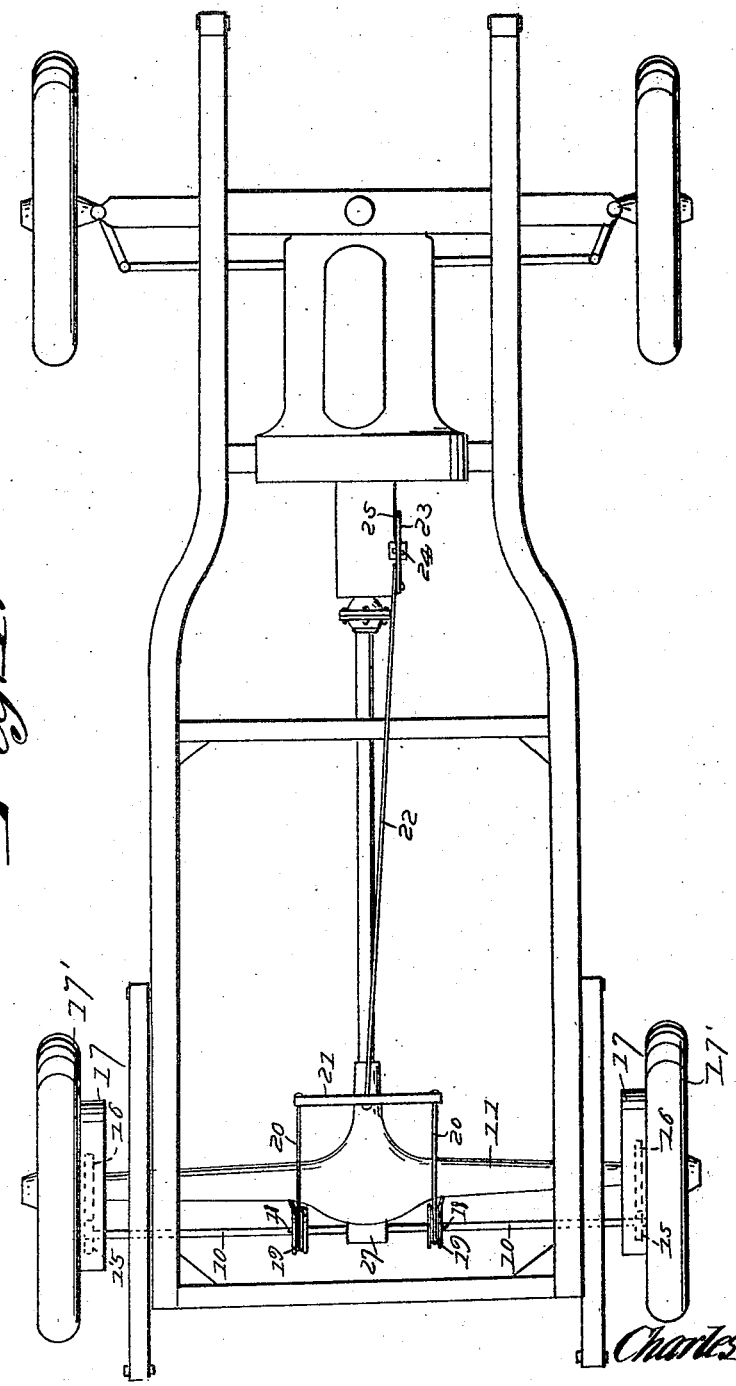

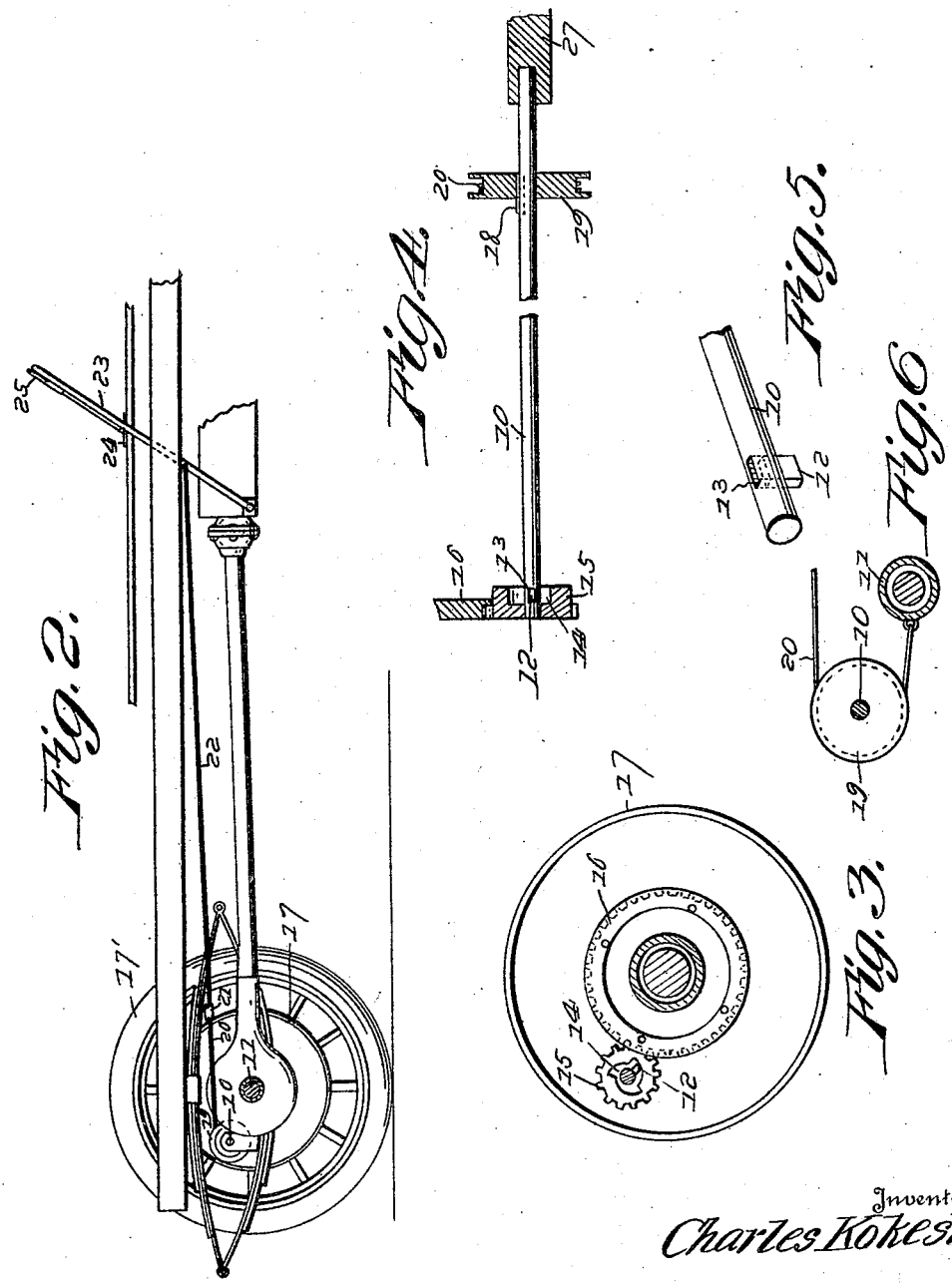

CHARLES KOKESH, OF CAINESVILLE, MISSOURI.

VEHICLE BRAKE.

1,414,882.  Specification of Letters Patent.  Patented May 2, 1922.

Application filed August 5, 1921. Serial No. 490,121.

*To all whom it may concern:*

Be it known that CHARLES KOKESH, a citizen of the United States of America, residing at Cainesville, in the county of Harrison and State of Missouri, has invented new and useful Improvements in Vehicle Brakes, of which the following is a specification.

The object of the invention is to provide simple, inexpensive and efficient means suitable for application as an attachment to motor driven and other vehicles to lock the same against rearward movement without resorting to the usual vehicle brakes, and hence adapted to hold a motor vehicle from retrograde movement on an inclined surface during the starting of the engine, and hence without interfering with the operation of starting, the braking attachment being applicable to the rear or driving wheels of the vehicle; and with this object in view the invention consists in a construction and combination of parts of which a preferred embodiment is shown in the accompanying drawings, wherein:

Figure 1 is a plan view of a brake mechanism applied in the operative position to a vehicle.

Figure 2 is a side view of the same.

Figure 3 is a detail view with the inner housing plate omitted.

Figure 4 is a sectional view showing the relation between the pawl carrying spindle and the ratchet.

Figure 5 is a detail view of one end of the pawl carrying spindle.

Figure 6 is a section on plane 6—6 of Figure 1 to show connection of belts to axle.

The device consists essentially of a spindle 10 mounted transversely of the car adjacent to and as illustrated in rear of the rear driving axle 11 with its extremities provided with pawls 12 mounted in transverse guides 13 in operative relation with ratchets 14 carried by pinions 15 which mesh with gears 16 carried by the rear driving wheels 17, the pawl carrying ends of said spindle together with the ratchets and pinions and gears being arranged in housings 17¹ carried by the rear axles but not rotatable with the wheels.

Secured to the pawl spindle as by means of keys 18 or the equivalents thereof are the pulleys 19 traversed by cords or belts 20 connected with a yoke bar 21 which in turn is connected by a brake rod or like tensile member 22 with a brake lever 23 in connection with which any desired locking means may be employed such as a catch 24 for engagement by a latch 25.

The ratchet being carried by the pinion 15 is rotatable with the gear 16 and hence the drive wheel to which it is attached, and the teeth of the ratchet are so disposed as to permit of rotation thereof with relation to the pawl 12 during the forward movement of the car even though the pawl and ratchet are in engaging relation as shown in Figure 4, the pawl being freely slidable transversely of the spindle to permit of such movement. Movement of the drive wheel in a reverse direction, however, is prevented, with the pawl and ratchet in engaging relation, provided the spindle 10 is held against rotation, by reason of the fact that the shoulders of the ratchet are opposed to the pawl in a retrograde or reverse movement of the ratchet, so that the brake mechanism constituting the invention and which for convenience may be termed the auxiliary brake mechanism in that it is independent of the ordinary brake mechanism employed in connection with motor vehicles and the like, may be maintained in set or operative position during the ordinary operation or running of the car. Should the car be brought to a standstill, however, on an upgrade any tendency thereof to back or commence a retrograde movement will be resisted by the auxiliary brake mechanism for the reasons above indicated. Should it be desired to back the car the auxiliary brake mechanism may be released by swinging the hand lever 23 to release the spindle and thereby permit it to turn with the ratchet.

Preferably the pawl spindle is formed in sections respectively carrying the pawls at opposite sides of the car and fitted at their inner ends as indicated at 26 in a sleeve or bearing 27 serving to connect the inner ends of the sections. The sleeve 27 is attached in any suitable manner to the rear axle and the belts 20 are of looped form serving to apply friction to the pulleys 19 without being wound thereon, the ends of the same being attached to the axle or other convenient object.

Obviously in starting a car from a standing position on an upgrade the auxiliary brake mechanism will hold the car against backward or retrograde movement after the usual brake devices have been released, so that in the event that the ordinary brake mechanism operates on the engine or engine shaft as is quite common the starting of the engine is not impeded though the rearward drifting of the car is prevented.

Having described the invention, what is claimed as new and useful is:—

1. An auxiliary brake mechanism for motor driven vehicles and the like provided with ratchets having geared connections with the driving wheels of the car, a pawl carrying spindle having pawls arranged in operative relation respectively with the ratchets, the latter being movable during the forward rotation of the drive wheels without tending to communicate motion to the spindle, and means for holding the spindle against rotary movement.

2. An auxiliary brake mechanism for motor driven vehicles and the like provided with ratchets having geared connections with the driving wheels of the car, a pawl carrying spindle having pawls arranged in operative relation respectively with the ratchets, the latter being movable during the forward rotation of the drive wheels without tending to communicate motion to the spindle, and means for holding the spindle against rotary movement, the pawls consisting of plates slidably mounted in transverse guides in the spindle for endwise shuttle movement in relation to said ratchets.

3. An auxiliary brake mechanism for motor driven vehicles and the like provided with ratchets having geared connections with the driving wheels of the car, a pawl carrying spindle having pawls arranged in operative relation respectively with the ratchets, the latter being movable during the forward rotation of the drive wheels without tending to communicate motion to the spindle, and means for holding the spindle against rotary movement, the ratchets being carried by pinions in permanent mesh with gears carried by the drive wheels.

4. An auxiliary brake mechanism for motor driven vehicles and the like provided with ratchets having geared connections with the driving wheels of the car, a pawl carrying spindle having pawls arranged in operative relation respectively with the ratchets, the latter being movable during the forward rotation of the drive wheels without tending to communicate motion to the spindle, and means for holding the spindle against rotary movement, the ratchets being carried by pinions in permanent mesh with gears carried by the drive wheels, and stationary housings carried by the rear axle for enclosing said gears, pinions and ratchets.

5. An auxiliary brake mechanism for motor driven vehicles and the like provided with ratchets having geared connections with the driving wheels of the car, a pawl carrying spindle having pawls arranged in operative relation respectively with the ratchets, the latter being movable during the forward rotation of the drive wheels without tending to communicate motion to the spindle, and means for holding the spindle against rotary movement and consisting of pulleys fixed to the spindle, brake belts traversing the pulleys and a lever actuated yoke for applying tension to said belts.

6. An auxiliary brake mechanism for motor driven vehicles and the like provided with ratchets having geared connections with the driving wheels of the car, a pawl carrying spindle having pawls arranged in operative relation respectively with the ratchets, the latter being movable during the forward rotation of the drive wheels without tending to communicate motion to the spindle, and means for holding the spindle against rotary movement and consisting of pulleys fixed to the spindle, brake belts traversing the pulleys and a lever actuated yoke for applying tension to said belts, said spindle consisting of sections respectively carrying the pulleys and a stationary sleeve within which the inner ends of said spindle sections meet.

In testimony whereof he affixes signature.

CHARLES KOKESH.